United States Patent
Nakamura et al.

(10) Patent No.: US 7,613,786 B2
(45) Date of Patent: Nov. 3, 2009

(54) DISTRIBUTED FILE SYSTEM

(75) Inventors: Takaki Nakamura, Yokohama (JP);
Kazunari Koyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 845 days.

(21) Appl. No.: 10/736,630

(22) Filed: Dec. 17, 2003

(65) Prior Publication Data
US 2004/0205202 A1    Oct. 14, 2004

(30) Foreign Application Priority Data
Mar. 10, 2003    (JP) .............................. 2003-063569

(51) Int. Cl.
*G06F 15/16* (2006.01)

(52) U.S. Cl. ................. 709/217; 709/225; 709/226; 395/608; 705/36; 707/8

(58) Field of Classification Search ............. 709/225, 709/226; 707/8; 705/36; 711/114, 113; 395/608
See application file for complete search history.

(56) References Cited

U.S. PATENT DOCUMENTS

| | | | | |
|---|---|---|---|---|
| 5,175,851 A | * | 12/1992 | Johnson et al. | 707/8 |
| 5,634,122 A | * | 5/1997 | Loucks et al. | 707/8 |
| 5,742,812 A | * | 4/1998 | Baylor et al. | 707/8 |
| 5,845,082 A | | 12/1998 | Murakami | |
| 5,884,308 A | * | 3/1999 | Foulston | 707/8 |
| 6,246,871 B1 | * | 6/2001 | Ala-Laurila | 455/413 |
| 6,385,701 B1 | | 5/2002 | Krein et al. | |
| 6,385,704 B1 | * | 5/2002 | Rao et al. | 711/151 |
| 6,466,978 B1 | * | 10/2002 | Mukherjee et al. | 709/225 |
| 6,665,675 B1 | * | 12/2003 | Mitaru | 707/10 |
| 6,826,570 B1 | * | 11/2004 | Eshel et al. | 707/8 |
| 6,834,351 B1 | * | 12/2004 | Kabenjian | 726/9 |
| 2003/0018785 A1 | * | 1/2003 | Eshel et al. | 709/226 |
| 2003/0110117 A1 | * | 6/2003 | Saidenberg et al. | 705/36 |
| 2004/0117549 A1 | * | 6/2004 | Nakamura | 711/114 |
| 2004/0153604 A1 | * | 8/2004 | Nagasawa et al. | 711/113 |

FOREIGN PATENT DOCUMENTS

JP    2003-322306    11/2000

OTHER PUBLICATIONS

SGI Infinite Storage Shared File System CXFX: A High-Performance Multi-OS File System from SGI by Shepherd, et al.

* cited by examiner

*Primary Examiner*—Thanh Tammy Nguyen
(74) *Attorney, Agent, or Firm*—Brundidge & Stanger, P.C.

(57) ABSTRACT

Disclosed is a distributed file system using the token method to allow file sharing by multiple clients (nodes) for improved system throughput. A storage device for holding files, and a server for managing tokens, and multiple clients for reading and writing the files in the storage device are connected over a network. On the distributed file system by which the client requests files by tokens, the server contains a token request means for requesting the return of tokens from the client holding the file. This token return request means sends a token return request means containing information on the client requesting the files by tokens and information showing the contents of the token.

8 Claims, 6 Drawing Sheets

DISTRIBUTED FILE SYSTEM

FIELD OF THE INVENTION

The present invention relates to a token type distributed file system capable of sharing files among multiple clients (nodes) for improving the system throughput.

BACKGROUND OF THE INVENTION

Distributed file systems are known in the related art for using tokens to maintain data consistency. These tokens include class such as data, attribute, size and name, etc. Each token possesses states (names) called read and write. A node holding a read-level data token for example, is permitted to read the file matching that token. A node holding a write-level data token is permitted to write on a file matching that token. A read-level token can be simultaneously held by multiple nodes but a write-level token can only be held by one particular node. So multiple nodes can simultaneously read the same file but multiple nodes cannot simultaneously write on a file.

Methods for issuing data tokens include a method to issue tokens granting rights to the entire file, and a method for issuing tokens granting rights to a limited range of data (for example, up to a certain byte from the first byte of a file).

These tokens may for example be provided in the format shown in FIG. 5. The file ID field 31 shows what kind of file the token is for. The revoke token class field 32 shows the class of token (data, attribute, size, name, etc.). The range specifier field 33 designates the range of the data.

This distributed file system of the related art typically has three cases. In a first case, multiple nodes can refer to the same file by read-only. In a second case, where one node reads and writes on a file, files access is extremely efficient. In a third case, however where multiple file nodes read and write on the same file, the performance drastically deteriorates.

The processing flow in the above third case is described while referring to the flow chart in FIG. 6. A precondition here is that the client A holds a write data token for file X. Another precondition is a state where latest update data on file X is not shown on the disk (prior to write). The processing flow for the precondition is shown by the thick lines with arrows.

When the client B completes I/O processing (write processing or read processing) for file X (process 101), the client B refers to its own token hold table and decides (process 102) whether or not the correct token (read-level token for read processing, write-level token for write processing) for file X is held. The processing shifts to process 110 when the client B decides it holds the correct token for file X.

When the client B does not hold a correct token for file X, it issues a request to the server C for the correct token. When the request for a token is received, the server C refers to its own token management table and decides (process 103) whether or not a client (computer) is holding the write-level token for file X. If there is no client holding the write-level token for file X then the processing shifts to process 108. In this case however, the client A holds the write-level token for file X so the server C requests a token revoke (return) for the client A.

When the client A receives the revoke request from the server C, it decides whether or not there is dirty data that is not shown (not yet written) in the disk in its own cache holding the file X data (process 104). If there is no dirty data, the processing shifts to process 106. However, if there is dirty data in the client A, then the client A writes the dirty data of file X back onto the disk (or server) (process 105). The client A next deletes the write-level token for file X from its own token hold table, and notifies the server C of return (sending back) of the token (process 106). When server C receives this return notification, it reflects (shows) the return of the token in its own token management table (process 107). The server C next reflects (shows) the granting of the request token to client B in the token management table processing, and sends a message to the client B informing that the requested token has been granted. The I/O processing of the disk (or server) is then performed (process 110) when finished showing that the token is for client B.

In other words, communications between nodes occur four times and disk I/O operation occurs two times; in a state where a node is holding a write-level data token for a certain file, and another node has accessed that same file.

[Patent Document 1]
 JP-A No. 322306/2000

[Non-patent Document 1]
 SGI® Infinite Storage Shared File System CXFX™: A High-Performance Multi-OS File System from SGI Laura Shepherd and Eric Eppe <URL: http://www.sgi.com/pdfs/2691.pdf>

In distributed file systems of the related art, 2 disk I/O processes and 4 inter-node communications occur during I/O processing by a node for a file whose token is held by another node. This processing must furthermore be performed in sequence, and time is required for I/O processing of the disk causing the problem that system performance deteriorates.

SUMMARY OF THE INVENTION

In view of the above problems with the related art, the present invention has the object of providing a distributed file system capable of reducing the I/O processing of the disk.

In the present invention, when the server issues a revoke-request to a node holding a token, information on the node requesting the token is also added to that revoke-request. So the file for that token does not have to be written back into the storage device and is delivered while still in a dirty state. Taking these steps allows reducing as much as possible the number of times the storage device is subjected to I/O processing (accessed) and processing is performed in parallel.

In the present invention, in a state where a node holds a write-level data token for a file, and another node has accessed that same file; that file is not written back into the storage device and the file can be delivered while still in a dirty state. Therefore, the number of times the storage device is accessed is reduced and files can in ideal cases be accessed with only four inter-node communications (no disk I/O accessing). So the throughput of the overall system is therefore improved.

In the log file processing shared by the nodes for example, short data memos are written among the multiple nodes so the number of times I/O processing of the disk is performed is reduced and throughput is improved.

DETAILED DESCRIPTION OF THE PREFERRED EMBODIMENT

Figure 1:
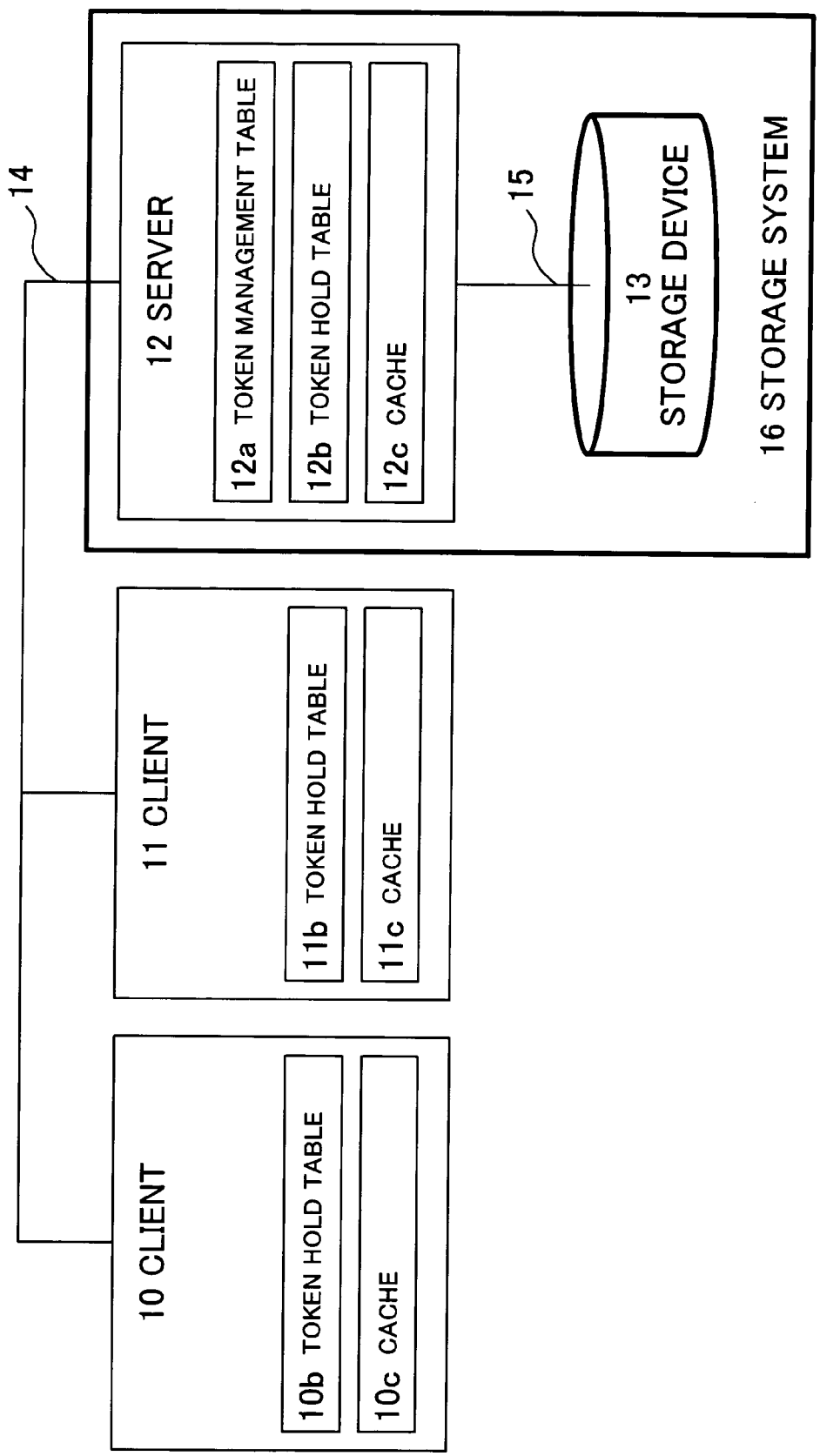
FIG. 1 is a block diagram showing the distributed file system of the first embodiment of the present invention.

The embodiments of the present invention are hereafter described while referring to the drawings.

FIG. 1 is a block diagram showing the distributed file system of the first embodiment of the present invention.

The clients 10 and 11 are computers functioning as nodes in the distributed file system. The clients 10, 11 and the storage system 16 are connected by a LAN (local area network) 14.

The clients 10 and 11 are respectively comprised of token hold tables 10b, 11b, and caches 10c, 11c. The token hold tables 10b, 11b store the contents of the token held by the clients. The caches 10c, 11c are memory devices that temporarily store data loaded from the storage system 16. These caches 10c, 11c contain a dirty flag showing whether or not the data stored in the cache is dirty data (non-shown data that has not yet been written in the storage device).

The storage system 16 contains a server 12, and a storage device 13 functioning as the Network Attached Storage (NAS). The server 12 and storage device 13 are connected by a storage area network (SAN) 15. This storage device 13 is comprised of a memory storage device such as a hard disk. The clients 10 and 11 can therefore read and write the data stored in the storage device 13 of storage system 16 by way of the LAN 14.

The server 12 contains a token management table 12a, a token hold table 12b, and a cache 12c. The token management table 12a stores corresponding data for all clients showing what the contents (for example, read or write) are of the token each client is holding. The token hold table 12b records the contents of the token the server is holding. The cache 12c is a memory for temporarily storing data.

The operation of the first embodiment of the present invention configured as described above is explained next.

The server 12 grants a token allowing the clients 10, 11 access to a file. The server 12 managing the tokens, knows what processing is currently being performed on what file by what client, by referring to the token management table 12a.

For example, when the client 10 is granted a write-level data token for a file A, the client 10 can load the file A from the storage device 13 and hold the file A in write mode in the cache 10c. Next, when the client 11 requests a read-level data token for the file A, the server 12 receives a read-level data token request from the client 11 and by referring to the token management table 12a, learns that the file A is being held in write mode by a write-level data token possessed by the client 10. The server 12 therefore makes a revoke (return) request to the client 10 to return that token. When this revoke processing is finished, the client 11 is granted a read-level data token for the file A, and the client 11 can then read that file A.

Figure 2:
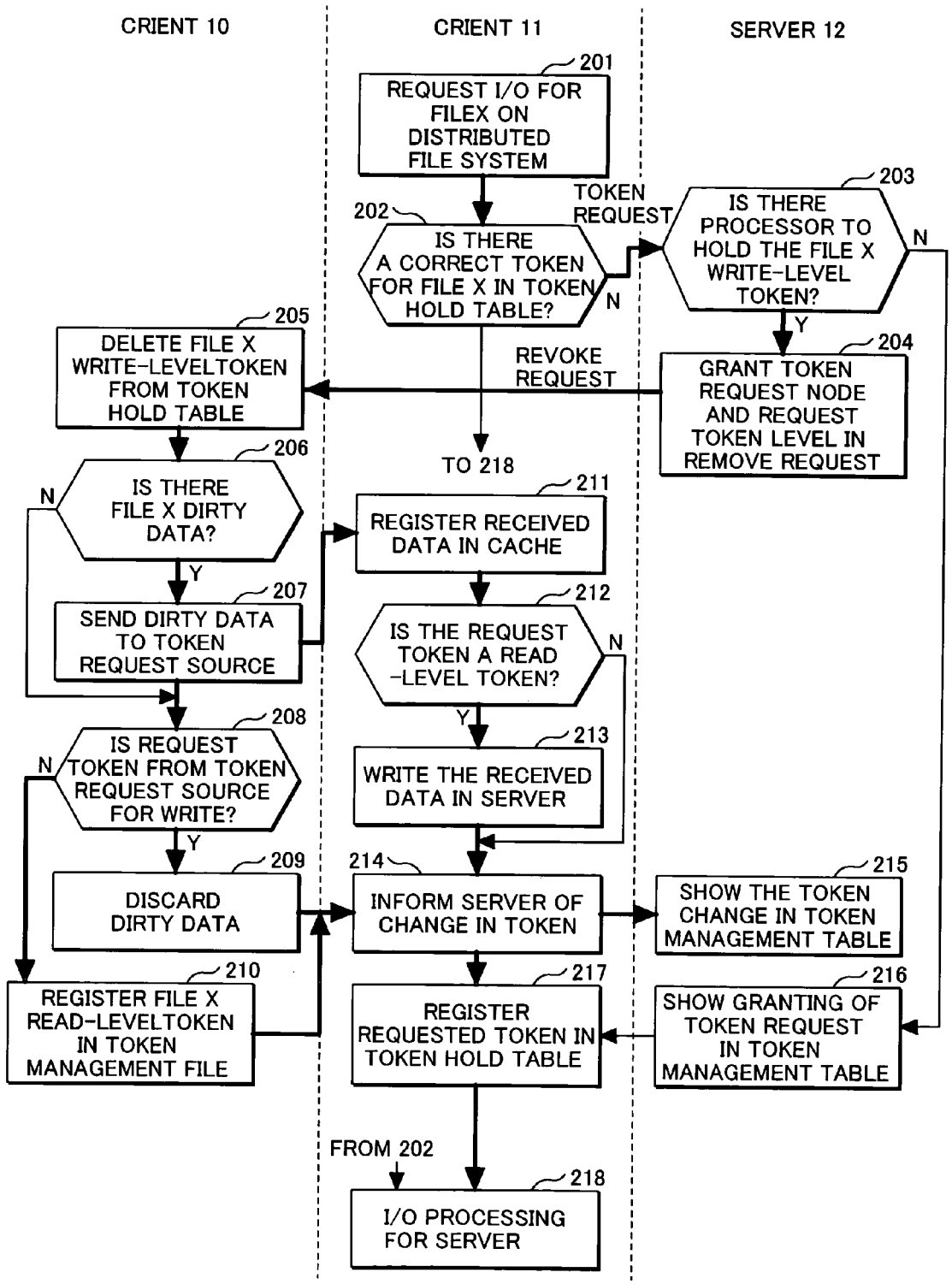
FIG. 2 is a flow chart showing the processing of that distributed file system.

FIG. 2 is a flow chart showing the I/O processing (file reading, file writing) of the file by the server 12 and clients 10, 11 in the first embodiment.

A precondition for the processing in this flowchart is that the client 10 is holding a write-level data token for file X. Another precondition is that the latest update data of file X does not appear in the disk. In other words, a precondition is that the file X contains dirty data. The process flow for these preconditions is shown by the thick line arrow in the figure.

When the client 11 needs to read the file X, the client 11 issues an I/O request for file X on the distributed file system (process 201).

The I/O request is received, and the client 11 decides whether or not its own token hold table 11b contains a correct token for file X (process 202). When decided that it (table 11b) holds the correct token, or in other words it holds a read-level data token if performing read processing on file X, or a write-level data token if performing write processing on file X, then the server 12 is accessed (I/O processing) and the file loaded from the storage device 13 (process 218).

However, when decided in process 202 that it (table 11b) does not hold the correct token, the client 11 sends a token request message to the server 12 to request a token. When the server 12 receives the token request message, the server 12 decides whether or not a client holding a write-level data token for file X is registered in the token management table 12a (process 203). The server 12 can immediately grant a token if there is no client holding a write-level data token, so the granting of a write-level data token to client 11 for file X is shown in token management table 12a (process 216). The server 12 also notifies the client 11 that a write-level data token is granted.

When this notification is received, the client 11 registers (process 217) in token hold table 11b, the level (read/write, etc.) of token requested in process 202, performs I/O processing on the server 12, and loads the file from the storage device 13 (process 218).

When decided in process 203 that there is already a client holding the write-level data token, a revoke-request message is sent to the client (client 10) holding that write-level data token (process 204). As described later in FIG. 3, this revoke-request message contains information on the node (client 11) requesting the token, and the level (read or write) of the requested token (level requested by the client 11).

After receiving the revoke request message, the client 10 starts processing (returns the write-level data token and delivers the file) to revoke the write-level data token. First of all, the write-level data token for file X is deleted from the token hold table 10b (process 205). Next, a decision is made whether or not the file X data in cache 10c of the client 10 is shown in the server 12 or not. In other words, whether or not there is dirty data in the file X is decided (process 206). When determined that there is dirty data, the file X containing the dirty data is sent (process 207) to the token request source (client 11). This token request source is acquired from the token request node contained in the token request message. The processing shifts to process 208 when file X is sent.

However, when decided in process 206 that there is no dirty data, the processing shifts to process 208.

The token request source (client 11) that received the file X, loads the received data into its own cache 11c (process 211). When the level of token requested at this time in process 202 by the client 11 is a read-level data token (process 212), the file X is immediately written (synchronous file processing) in the server 12 (process 213). This synchronous file processing is performed because file consistency is lost when a client holding only the read-level data token has a file containing dirty data. In other words, multiple clients can simultaneously load a file so file consistency cannot be maintained when there is data not shown on the disk.

The client 10 at this time checks the request token level field of the token request source from the revoke request message received in process 205. The client 10 determines (process 208) the level of requested token (whether the requested token is a read-level or write-level token). When the client 11 determines the requested token is a write-level data token, it invalidates the file X dirty data in its own cache 10c (process 209). The client 11 invalidates (discards) dirty data because write-level tokens for the same file cannot be granted to multiple clients. So if other nodes request have requested the write-level data token, the revoke processing shifts the file usage rights completely over to the client holding the write-level data token. When the processing is finished, the change in its own token level is reported to the token request source (client 11).

However, when the client 10 determines in step 208 that the token request source has requested a read-level data token, it clears the dirty flag showing the dirty status of the file X dirty data within the cache. This data itself is not discarded (invalidated) but instead changed into read-only data and stored within the cache 10c. The client 10 then registers that file X read-level data token in its own token hold table (process 210). This process is performed because, multiple clients can simultaneously possess read-level data tokens for the same file, and because the dirty data in file X is shown (written) in the disk in process 213. When the processing is finished, the change in its own token level is reported to the token request source (client 11).

The client 11 at this point receives notification of the change in token level from the client 10 due to the process 209 or the process 210. When the process 213 is finished, the change in token level of the client 10 (token revoke request destination) and its own token level (client 11 as the token revoke request source) is sent to the server 12 (process 214). This change in the token level of client 10 may be sent directly from the client 10 to the server 12 without passing via the client 11.

The server 12 shows this change in tokens in the token management table 12a (process 215).

Next, the client 11 registers the token requested in process 202, in its own token hold table 11c (process 217). The client 11 then executes I/O processing on the server 12 if necessary and loads the file into the storage device 13 (process 218).

This processing completes the return of the token from client 10. The file X containing dirty data is also given to the client 11 from client 10.

In this processing, the sending of file X containing dirty data to the client 11 from client 10 (process 207 through process 211) and the sending of the token level change notification (process 209, 210 through process 214) were performed separately. However these two items (X-file and token change notification) can also be summarized into one message and sent.

In process 207 of FIG. 2, the file can be written on the storage device 13 if this offers better performance than sending it to the client 11. In other words, when the client (or server 12) has determined that the disk I/O throughput is higher than LAN throughput, based on performance prediction formulas set beforehand, using LAN throughput and storage device I/O throughput performance, then instead of sending the file to the client requesting it, the file no longer having dirty status is written onto the storage device 13 for loading (reading) by the client. In this way, the processing means having a high throughput is given priority and the throughput of the overall distributed file system is improved.

Figure 3:
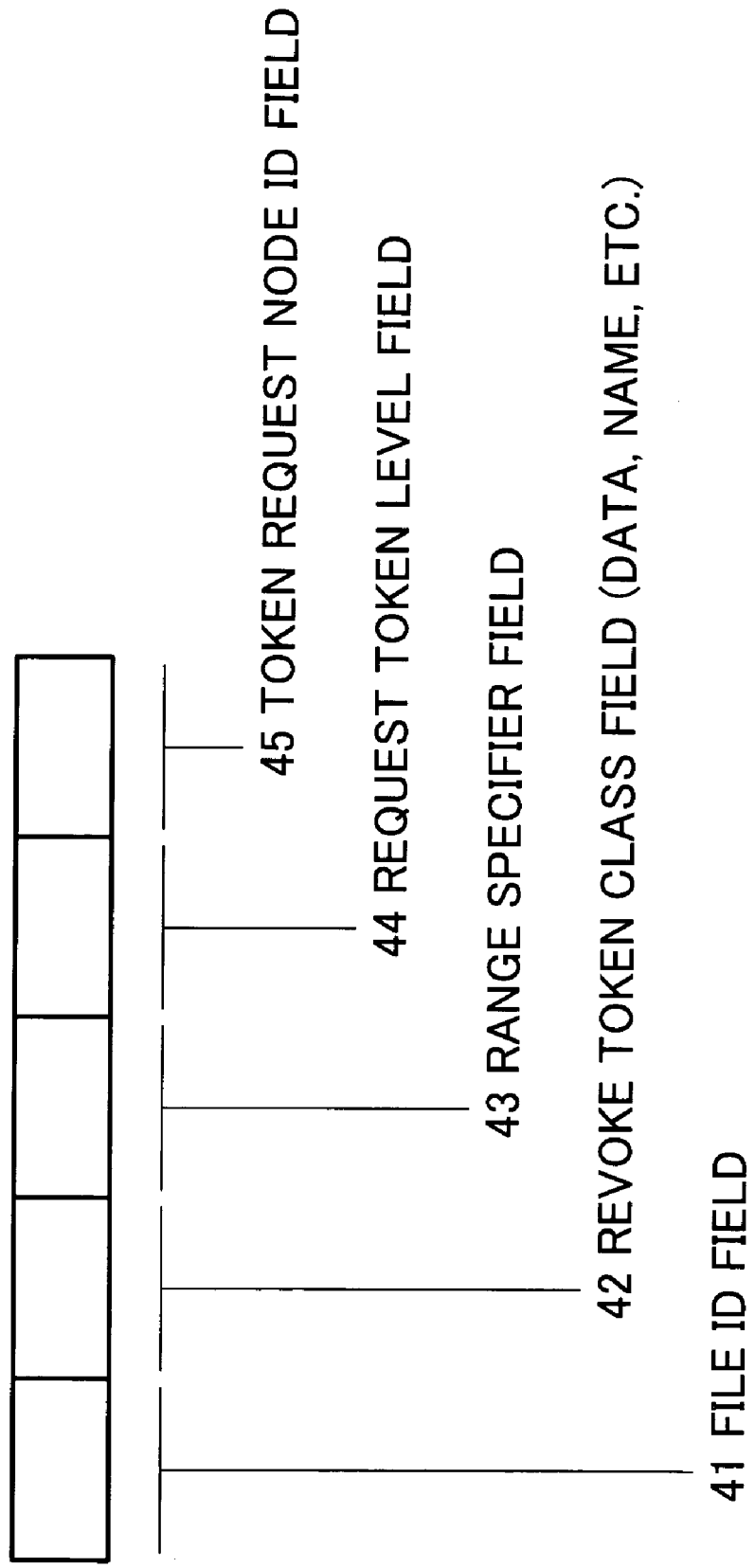
FIG. 3 is a drawing showing the format and contents of that revoke-request token.

The processing of the token request message sent in process 204 in FIG. 2, is next described in detail using FIG. 3.

The token request message is comprised of a file ID field 41, a revoke token class field 42, a range specifier field 43, request token level field 44, and a token request node ID field 45.

The file ID field 41 shows information on the file for the token request. The revoke token class field 42 shows the class of token (for example, data, attribute, size, file name, etc.). The range specifier field 43 shows the file range. In a distributed file system where a token can specify the file range, the client only needs to process the range specified in the range specifier field 43. The request token level field 44 shows the level (read/write) of the token. The token request node ID field 45 shows information on the request source client requesting the token.

In the first embodiment of the distributed file system of the present invention as described above, when the client has requested a file containing dirty data held by another client, the file is not written back into the storage device and is instead delivered while still in a dirty state to the other client. Therefore, the number of times the storage device is accessed can be reduced and the throughput of the entire distributed file system is improved.

The distributed file system of the second embodiment of the present invention is described next. This second embodiment differs from the first embodiment in that each client is directly connected with a storage device by a SAN (storage area network) and the data on the storage device can be loaded (read and write) via a server. Sections having the same structure as the first embodiment are assigned the same reference numerals and their description is omitted.

Figure 4:
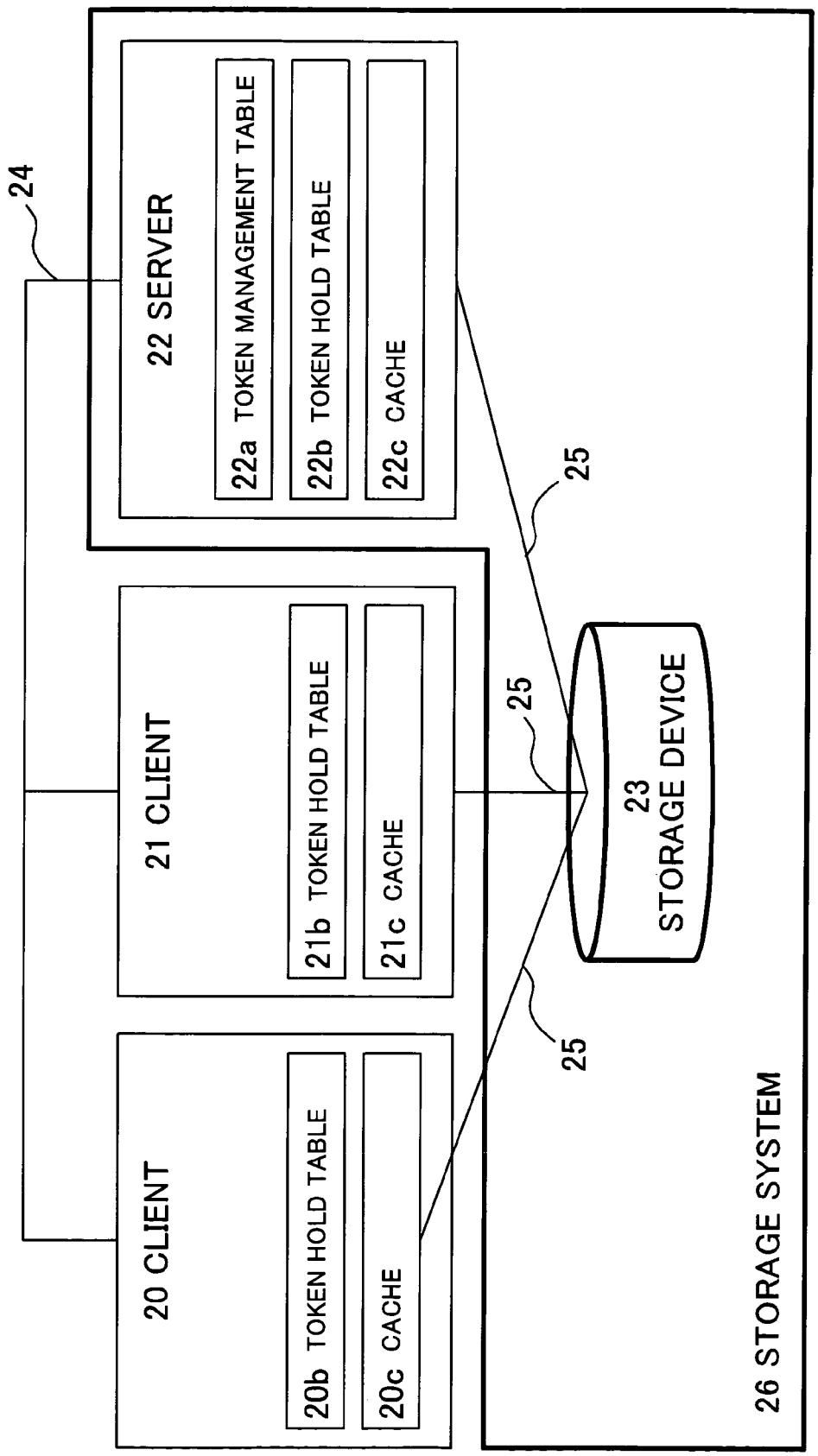
FIG. 4 is a block diagram showing the distributed file system of the second embodiment of the present invention.
Figure 5:
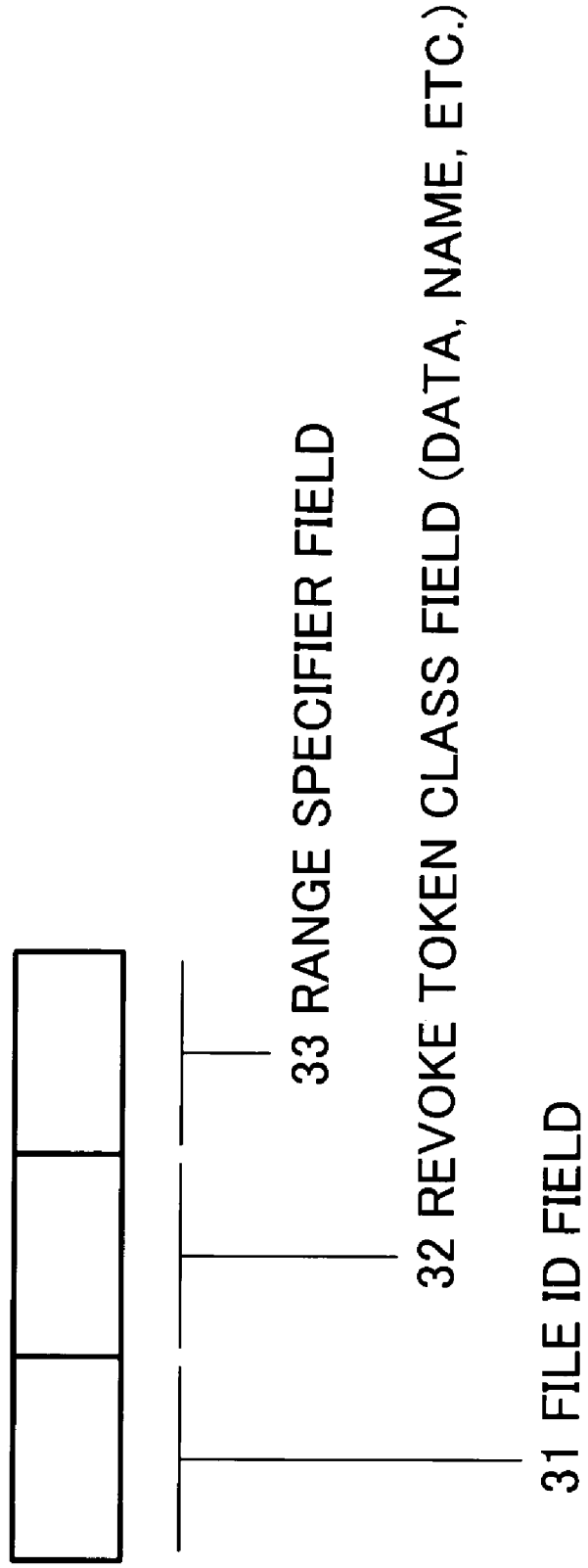
FIG. 5 is a drawing showing the format and contents of the token revoke-request of the related art.
Figure 6:
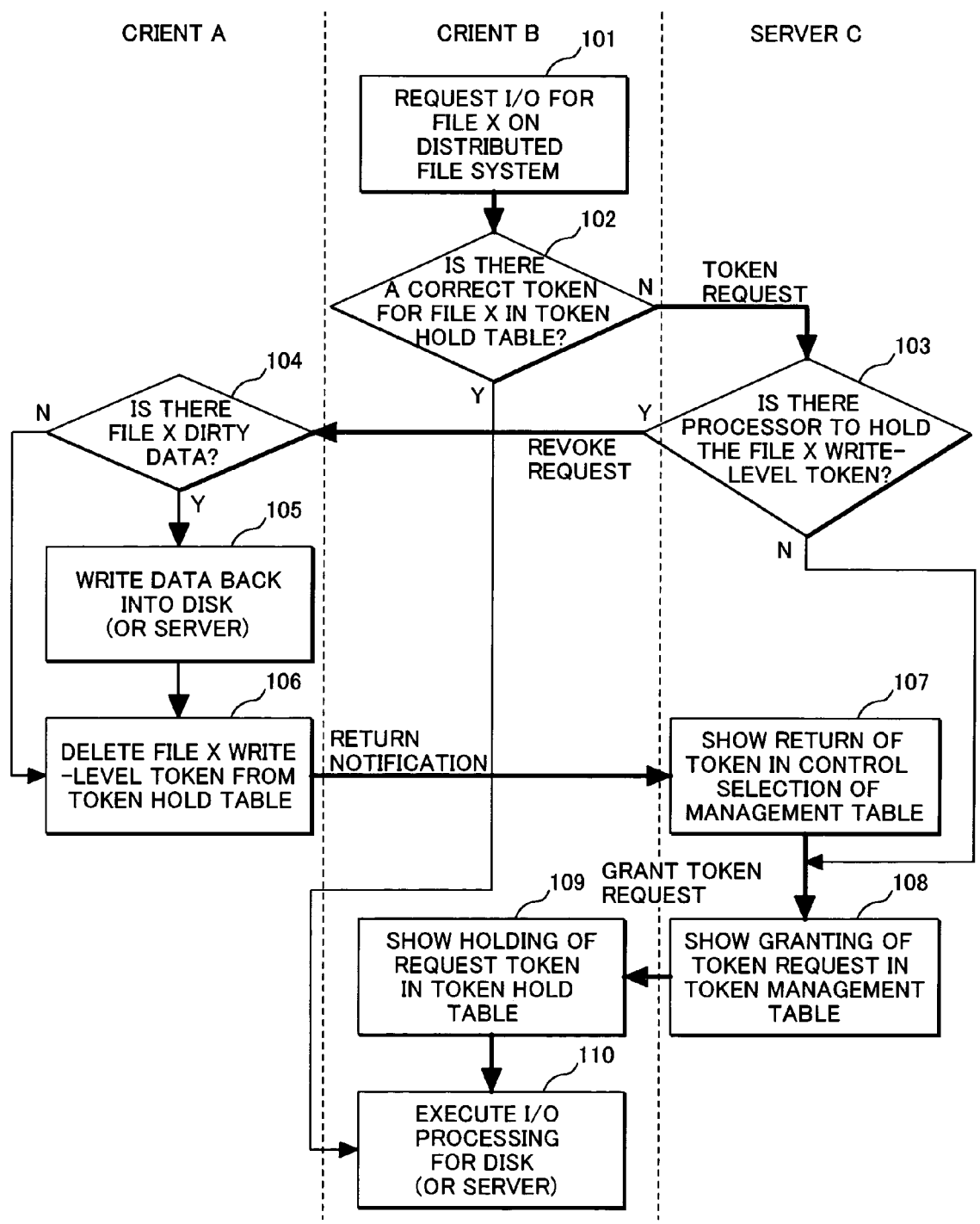
FIG. 6 is a drawing showing the processing of the distributed file system of the related art.

FIG. 4 is a block diagram showing the distributed file system of the second embodiment of the present invention.

The clients 10 and 11, and the storage system 26 (server 22) are connected by the LAN 24.

The storage system 26 contains a server 22 and a storage device 13. The server 22 is connected to the storage device 13 by the SAN 25.

The clients 10 and 11 are also connected to the storage device 13 by the SAN 25. The clients 10 and 11 can therefore load the file in the storage device 13 without using the server 22, and can also write on file in the storage device 23. In other words, the storage area network (SAN) is made up of the clients 10 and 11, the server 22 and the storage device 13.

The server 22 contains a token management table 22a, a token hold table 22b, and a cache 22c. The token management table 22a receives the tokens issued from the clients, attaches information on what client, what level of token content (for example read or write, etc.) linked to the applicable data and stores it. The token hold table 22b holds the contents of the token requested by the client. The cache 22c is a memory for temporarily storing the data.

The operation of the second embodiment of the distributed file system of the present invention is described next.

The processing flow of this embodiment is basically the same as the first embodiment (FIG. 2). However, the clients 10, 11 can perform I/O processing of the storage device 13 without using the server. In process 213 of FIG. 2, the file X is written in the storage device 13 after being sent to the server 12. However in the second embodiment, the client 11 directly accesses the storage device 13 and writes the file X. In process 218 in the same way, the client 11 directly accesses (I/O processing) the storage device 13 to load the file X.

Therefore, besides the effects rendered by the first embodiment, in the second embodiment the client can access (perform I/O processing) the storage device without using the server 12, so the processing on the server 12 is reduced and the result rendered that the overall throughput of the distributed storage system is improved.

What is claimed is:

1. A distributed file system comprising: a storage device for holding files; multiple clients for carrying out file operations on said storage device;

a server using tokens to control rights to file reading and writing operations by the clients;

and a network coupling said clients, said storage device and said server, wherein said server contains a token revoke request means for sending a token revoke request for demanding a return of a token granting rights to write on said file, to a first client that holds said token, wherein said token revoke request means sends said token revoke request, which includes information identifying a second client that requested said file, and information indicating a level of said token requested by said second client, said level being either read or write, wherein said first client comprises a memory section for holding file data loaded from said storage device and a data output means for sending said file held in said memory section and relating to said token, to said server for said second client that requested said token when said token revoke request is received, wherein said data output means sends data in a range among files linked by said token, to said server for said second client that requested said token, and performs synchronous processing on said storage device by writing data in a range among said files not linked by said token, and wherein said data output means decides whether to send said token of said file held in said memory section to said server for the second client that requested the token, or to write said file in said storage device and perform synchronous processing on said storage device, based on an input/output capacity of said network and said storage device and a data size of said file sent to said server for said second client that requested the token.

2. The distributed file system according to claim 1, wherein the file relating to said token sent from said first client to the server for said second client that requested said token, contains information not already appearing in the latest information in said storage device.

3. A file send and receive method utilized in a distributed file system, wherein said distributed file system includes a storage device for holding files, multiple clients for carrying out file operations on said storage device, a server using tokens to control rights to file reading and writing operations by the clients, and a network coupling said clients, said storage device and said server, said method comprising:

making a request to said server for a token for rights to perform said file operations, wherein a first client makes the request to said server;

sending, by said server, said token revoke request to a second client that holds write operation rights to said file, so as to request a return of the token for said write operation rights, wherein said token revoke request includes information identifying the first client that requested the token for said file, and information indicating a level of the token requested by said first client, said level being either read or write; and sending, by said second client that received said token revoke request, the file for said token held in said memory section, to the first client that requested the token for said file, wherein said first client that received the token revoke request sends data in a range among files linked by said token to the server for said second client that requested said token, and performs synchronous processing on said storage device by writing data in a range among files not linked by said token on said storage device, and wherein said first client that received the token revoke request, decides whether to send the file being held to the server for the second client making the request for said token, or to write the file in said storage device and perform synchronous processing of said store device, based on an input/output capacity of said network and said storage device, and a data size of the file sent to the server for the second client that requested the token.

4. The file send and receive method according to claim 3, wherein the file relating to said token sent from said first client that received the token revoke request to said server for said second client that requested said file does not show the latest information in said storage device.

5. A first client device utilized in a distributed file system, wherein said distributed file system includes a storage device for holding files, multiple client devices for carrying out file operations on said storage device, a server using tokens to control rights to file reading and writing operations by the client devices, and a network coupling said clients devices, said storage device and said server, said first client device comprising:

a memory section for holding file data loaded from said storage device; and a data output means for sending a file relating to a token held in said memory section to a second client device that requested the token for said file when a request for returning said token for rights to read or write on said file is received by said first client device from said server, wherein said request includes information identifying said second client that requested said token for said file, and information indicating a level of said token requested by said second client, said level being either read or write, wherein said data output means sends data in a range among said files linked by said token, to said server for said second client that requested said token, and performs synchronous processing on said storage device by writing data in a range among files not linked by said token, and wherein said data output means decides whether to send the file being held to the server for the second client that requested said token, or to write the file in said storage device and perform synchronous processing of said storage device, based on an input/output capacity of said network and said storage device and a data size of the file sent to the server for the second client that requested the token.

6. The first client device according to claim 5, wherein the file relating to said token sent to said server for the second client device that requested said token, does not show the latest information on said storage device.

7. A program embedded on a computer-readable storage medium, wherein the program is executed on a server device for controlling tokens for rights to file reading and writing by a first client coupled via a storage device and network, wherein said first client requests a token for rights to file reading or writing, and wherein said program causes the server device to:

send a request for a return of said token for rights to file reading or writing, to a second client that holds rights to read or write on a file, wherein said request includes information identifying said first client that requested said token for said file, and information indicating a level of said token requested by said request client, said level being either read or write, wherein said first client that received the token revoke request sends data in a range among files linked by said token to the server for said second client that requested said token, and performs synchronous processing on said storage device by writing data in a range among files not linked by said token on said storage device, and wherein said first client that received the token revoke request, decides whether to send the file being held to the server for the second client making the request for said token, or to write the file in said storage device and perform synchronous processing of said storage device, based on an input/output capacity of said network and said storage device, and a data size of the file sent to the server for the second client that requested the token.

8. A program embedded on a computer-readable storage medium, wherein the program is executed on a first client device for controlling rights to reading and writing of files stored on a storage device coupled by a network, by utilizing tokens managed by a server, wherein said first client requests a token for the rights to reading and writing, and wherein said program causes the first client device to:

send a file relating to the token held in said storage section to a second client device that requested said token for said file, when a request to revoke said token for rights to write on said file is sent from said server, wherein said request includes information identifying said second client that requested said token for said file, and information indicating a level of said token requested by said second client, said level being either read or write, wherein said first client that received the token revoke request sends data in a range among files linked by said token to the server for said second client that requested said token, and performs synchronous processing on said storage device by writing data in a range among files not linked by said token on said storage device, and wherein said first client that received the token revoke request, decides whether to send the file being held to the server for the second client making the request for said token, or to write the file in said storage device and perform synchronous processing of said storage device, based on an input/output capacity of said network and said storage device, and a data size of the file sent to the server for the second client that requested the token.

* * * * *